United States Patent Office 3,506,881
Patented Apr. 14, 1970

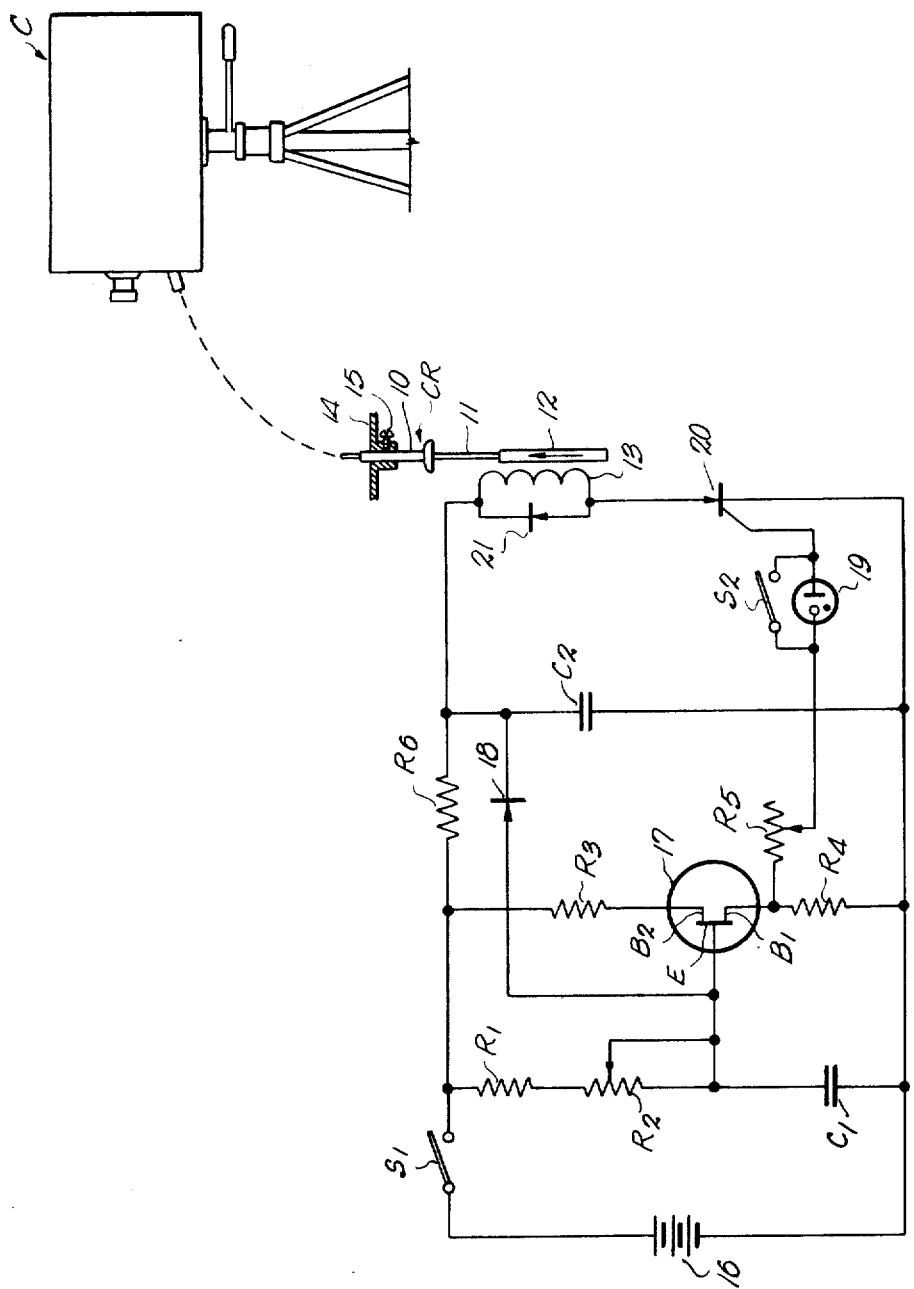

3,506,881
VARIABLE TIME INTERVAL CABLE RELEASE FOR MOTION PICTURE CAMERAS
Thomas P. Leary, % 1212 First National Bank Bldg., Omaha, Nebr. 68102
Filed Dec. 12, 1966, Ser. No. 601,190
Int. Cl. H01h 47/24, 47/18, 47/32
U.S. Cl. 317—130    3 Claims

ABSTRACT OF THE DISCLOSURE

A portable battery operated timer employing solid state circuitry which energizes a solenoid or similar electromagnetic device at variable preselected and uniform time intervals to trip a cable release attached to a motion picture camera.

BACKGROUND OF THE INVENTION

Of the time lapse camera attachments of which I am presently aware, all are operated from 60 cycle AC current and most employ synchronous motors and various arrangements of cams and gears for making the time interval adjustable. In such units, access to a power line connection is necessary for operation and adjustment of the time interval between takes is not something which can be easily accomplished. Moreover, they are not easily portable and employ delicate mechanisms which are subject to shock, damage or contamination by foreign matter.

SUMMARY OF THE INVENTION

One of the main objects of the present invention is to solve in part the problems noted above by providing a portable battery operated interval timer operable to energize a solenoid or similar magnetic device and having means for effecting a continuously variable interval between pulses of the magnetic device. A feature of my invention in this respect is that the timer employs solid state circuitry and avoids entirely mechanical systems such as motors, cams or gears. As a result, units embodying my invention are lower in cost of production and still are generally improved in reliability and useful operating life.

Another object of the invention is to provide apparatus of the character described which requires little current to operate, thus providing the unit with the capability of operating over long periods of time without necessitating battery replacement.

Still another object of the invention is to provide a timer of the character described which includes light sensitive means operable to inactivate the camera operating circuit in the event that the light available is inadequate for photographing and which reactivates the circuit when the light returns to the proper illumination level.

A further object of the invention is to provide a time lapse photography timer and camera operator which can be readily applied to a variety of cameras, which has good reliability and which is simple to set up for use.

Other and further objects of the invention, together with the features of novelty appurtenant thereto, will appear in the course of the following description.

DETAILED DESCRIPTION

In the accompanying drawing, the single figure constitutes a schematic diagram of a timer and camera operator made in accordance with a preferred embodiment of the invention operatively connected with a typical motion picture camera.

A typical motion picture camera is indicated schematically at C, the camera being adapted for intermittent single frame operation by a cable release CR. The cable release comprises the sleeve 10 and plunger 11.

The plunger 11 is mechanically connected with the armature 12 of an electromagnet having the coil 13. Since cameras of different make each may require a different cable release stroke for operation of the shutter, I have mounted the sleeve 11 for longitudinal adjustment in an opening in the casing for the unit, a portion of which is shown at 14. Longitudinal adjustment of the sleeve within the opening is permitted through backing off and retightening the lateral set screw 15.

Since the electrical components for the unit are shown schematically, I have not shown the entire case for the unit. It will be understood that any suitable physical arrangement and case structure and shape may be employed. I desire to have the case supported separately from the camera. The flexible cable thus absorbs any vibration resulting from the intermittent pulses of the electromagnet.

The electromagnet is energized or pulsed at repeated intervals by means of the timer circuit now to be described.

The power source, which is direct current, comprises the battery 16 which in the preferred embodiment consists of eight (8) "penlight" cells (1.5 volts) providing a nominal voltage of 12 volts. When a main control switch $S_1$ is closed, current can flow from the battery 16 through the fixed resistance $R_1$ and variable resistance $R_2$ and charge the capacitor $C_1$ connected in series with the resistances.

The battery potential is also applied through switch $S_1$ to a circuit including resistances $R_3$ and $R_4$ and the base electrodes $B_1$ and $B_2$ of the unijunction transistor 17. The unijunction transistor is generally of the characteristics referred to in Patent 2,968,770.

A second capacitor $C_2$ is also connected across the battery through a resistance $R_6$. A circuit from the emitter E of the unijunction transistor 17 to the capacitor $C_2$ is provided, this circuit including the diode 18.

The output of the unijunction transistor circuit as thus far described is connected through a variable resistance $R_5$ and a light sensitive photocell 19 to the gate of a silicon controlled rectifier 20. A switch $S_2$ is connected across the photocell 19 and can be employed for bypassing same. The anode-cathode of rectifier 20 is in a circuit which includes capacitor $C_2$ and the coil 13 of the solenoid. Direction of flow of current through the solenoid circuit is controlled in part by the diode 21.

To prepare the unit for operation, the camera is positioned as desired and switch $S_1$ is closed. As earlier noted, in response to the closing of switch $S_1$ capacitor $C_1$ commences charging, the time rate at which the charge is built up being capable of variation through adjustment of the resistance value of the potentiometer $R_2$. The lower the resistance the higher the charge rate. Obviously, the potentiometer can be calibrated to correlate resistance with time value in seconds.

As capacitor $C_1$ charges, capacitor $C_2$ also charges through resistance $R_6$. For reasons which will subsequently be explained, the time constant of $R_6$–$C_2$ is shorter than the shortest possible time constant of $R_1$, $R_2$ and $C_1$ so that $C_2$ has reached available battery voltage by the time that $C_1$ performs its function, now to be described.

Normally, no current flows from the emitter E to base $B_1$ of the unijunction transistor. However, when the voltage at capacitor $C_1$ reaches the operating parameter of the unijunction transistor, a relatively large current will flow across the emitter E to base $B_1$ and as a consequence a momentary voltage is developed across $R_4$. This voltage is sufficient to trigger the gate of and turn on the silicon controlled rectifier 20, provided that the series resistance of $R_5$, photocell 19 and the gate to cathode resistance of element 20 is low enough. If insufficient light is falling on the photocell, its resistance will be high and not enough current will flow from the cathode to gate of the rectifier to turn it on. The sensitivity of control afforded by the photocell can be adjusted by means of adjusting the resistance at $R_5$. Also, it will be evident that the photocell can be bypassed and the unit operated without illumination level control by closing switch $S_2$.

The turning on of the rectifier 20 permits capacitor $C_2$ to discharge through the solenoid coil 13 with the result that the armature 12 is actuated to depress the cable release of the camera, thereby to operate the shutter thereof and expose a single frame. When capacitor $C_2$ is fully discharged, current stops flowing through the rectifier 20 and turns it off. The armature 13 is returned to its original position by the spring return mechanism normally included in a cable release or camera and the circuit is ready to undergo a similar cycle.

In the operating cycles subsequent to the initial operating cycle, the diode 18 serves a dual function.

It will be evident that due to the presence of resistance $R_4$, which is necessary to limit the emitter E to base $B_1$ current in the unijunction transistor during discharge of capacitor $C_1$, the transistor stops conducting before capacitor $C_1$ has discharged completely. If all the residual charge were retained in capacitor $C_1$, the time required to bring capacitor $C_1$ back to the transistor operating voltage would necessarily be shorter than if it were partially or completely dissipated. If not remedied, this could prevent the unit from having the capability of long time intervals between operations of the circuit and would limit the flexibility of operation necessary to an all purpose timer.

It will be recalled that the time constant of the $R_6$, $C_2$ circuit is shorter than the shortest time constant of the $R_1$, $R_2$, $C_1$ circuit. Capacitor $C_2$ discharges completely when the rectifier 20 is turned on. A flow path from capacitor $C_1$ to capacitor $C_2$ is provided through the circuit including the diode 18, and accordingly any excess charge on capacitor $C_1$ is applied to $C_2$.

In addition to reducing the charge on $C_1$, the arrangement described above has the advantage of conserving the charge by applying the excess to $C_2$, thus prolonging battery life.

As the light level falls, the resistance provided by the photocell 19 increases until the voltage generated across the gate cathode of the rectifier 20 will not trigger it and release the charge in capacitor $C_2$. Pulses through the unijunction transistor 17 will continue at intervals until such time as the light level increases to the point necessary to reduce the resistance of the photocell to the point where the rectifier will again trigger.

The entire circuit is relatively independent of changes in temperature and battery voltage and the circuit will continue to operate until the battery voltage falls to a value near the operating voltage of the unijunction transistor.

In a typical system in which I have been able to provide variable uniform time intervals of 5 seconds to 20 minutes, and an operating life of from 50 to many hundred of hours, depending upon the rapidity of cycling, the following components were employed:

Battery—Eight 1.5 "penlight" cells
$R_1$—4700 ohms
$R_2$—logarithmic taper 500,000 ohm potentiometer
$R_3$—200 ohms
$R_4$—22 ohms
$R_5$—2000 ohms linear taper potentiometer
$R_6$—470 ohms
$C_1$—1000 mfd. 10 volt electrolytic condenser
$C_2$—5000 mfd. 15 volt electrolytic condenser
Unijunction transistor—General Electric 2N2160
Photocell—Cadmium sulfide In a unit constructed as above, the average current drain at the shortest time lapse setting of 5 seconds is about 10 milliamperes and may be as little as 2 milliamperes at the longest.

The light level control provided by the photocell is a very important feature in utilizing the time for certain camera operations. For example, in order to take time lapse movies of a growing plant or of a construction project, the camera must be started at dawn and shut off at sunset. With my arrangement, when the light level drops to the point where photographs should no longer be taken, the camera stops until the light level is restored.

For best results, the time lapse unit should be supported separately from the camera since a slight vibration is inevitable when the solenoid closes. If the timer unit is attached to the camera, it can cause blurring of the photograph. The flexible cable release provides the necessary connection between the camera and the timer. Since the depth of stroke of the cable release needed to operate the shutter varies from one make of camera to another, I have provided the adjustment arrangement comprising the screw 15 and sleeve in which the cable release is received.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. In a timer for intermittently operating a mechanism at the end of each of successive, uniform time intervals of a preselected but controllable frequency, a normally "off" silicon control rectifier, an operating circuit including a solenoid and the anode-cathode of said rectifier, said solenoid operatively connected with said mechanism, a first capacitor connected across said operating circuit, a voltage source connected with said first capacitor for charging same, pulse generating means connected with the gate of said rectifier and including a second capacitor connected with said voltage source, said means operable at the end of each of successive, uniform time intervals of a preselected but controllable frequency to trigger said rectifier to an "on" condition, thereby to discharge said first capacitor through said solenoid and to operate said mechanism, said rectifier operable to return to said "off" condition when said first capacitor is discharged, and a circuit including a diode connected between said first capacitor and said second capacitor and permitting discharge from said second capacitor toward said first capacitor.

2. In a timer for intermittently operating a mechanism at the end of each of successive, uniform time intervals of a preselected but controllable frequency, a normally "off" silicon control rectifier, an operating circuit including a solenoid and the anode-cathode of said rectifier, said solenoid operatively connected with said mechanism, a capacitor connected across said operating circuit, a voltage source connected with said capacitor for charging same, a pulse generating means connected with the gate of said rectifier, said means operable at the end of each of successive, uniform time intervals of a preselected but controllable frequency to trigger said rectifier to an "on" condition, thereby to discharge said capacitor through said solenoid and to operate said mechanism, said rectifier operable to return to said "off" condition when said capacitor is discharged, and a light sensitive resistance element interposed between said pulse generating means and the gate of said rectifier operable to prevent triggering of said gate when the light level is below a predetermined value.

3. In a timer as in claim 2, switch means operable to bypass said light sensitive element.

References Cited

UNITED STATES PATENTS

| 3,162,772 | 12/1964 | Smith | 317—148.5 |
| 3,302,128 | 1/1967 | Schoemehl | 317—148.5 |
| 3,343,043 | 9/1967 | Kioshi | 317—141 |

LEE T. HIX, Primary Examiner

W. J. SMITH, Assistant Examiner

U.S. Cl. X.R.

307—293, 311; 317—142, 148.5, 151